United States Patent
Barone

(10) Patent No.: US 9,518,668 B2
(45) Date of Patent: Dec. 13, 2016

(54) CHECK VALVE WITH BACKBONE ENHANCED PETALS

(71) Applicant: HAMILTON SUNDSTRAND CORPORATION, Windsor Locks, CT (US)

(72) Inventor: Michael R. Barone, Amston, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 68 days.

(21) Appl. No.: 14/454,034

(22) Filed: Aug. 7, 2014

(65) Prior Publication Data
US 2016/0040793 A1   Feb. 11, 2016

(51) Int. Cl.
*F16K 15/03*   (2006.01)

(52) U.S. Cl.
CPC ........ *F16K 15/038* (2013.01); *Y10T 137/7839* (2015.04); *Y10T 137/7898* (2015.04)

(58) Field of Classification Search
CPC ............. F16K 15/038; Y10T 137/7898; Y10T 137/7839
USPC .............................................. 137/512.1, 527
See application file for complete search history.

(56) References Cited

U.S. PATENT DOCUMENTS

| 3,965,926 A | 6/1976 | Buckner |
| 2008/0072973 A1 | 3/2008 | McGonigle et al. |
| 2012/0042968 A1* | 2/2012 | Shanker ................ F16K 15/038 137/527 |
| 2013/0340862 A1 | 12/2013 | Kamp et al. |
| 2016/0010757 A1 | 1/2016 | Barone |

FOREIGN PATENT DOCUMENTS

EP   2034224   3/2009

OTHER PUBLICATIONS

International Search Report, International Application No. GB/1514007.2, Date of Mailing Feb. 2, 2016, GB Intellectual Property Office; 3 pages.

* cited by examiner

*Primary Examiner* — Kevin Lee
*Assistant Examiner* — P. Macade Nichols
(74) *Attorney, Agent, or Firm* — Cantor Colburn LLP

(57) ABSTRACT

A check valve includes a base, two sidewalls extending from the base and a pin coupled between the two sidewalls. The valve also includes a flapper pivotably coupled to the pin to occupy respective open and closed positions in accordance with a pressure differential of a fluid flow across the check valve, the flapper including a plate and a backbone that is thicker than the base and the extends along an entire length of the plate.

17 Claims, 5 Drawing Sheets

CHECK VALVE WITH BACKBONE ENHANCED PETALS

BACKGROUND OF THE INVENTION

The subject matter disclosed herein relates to a check valve and, more particularly, to a check valve having backbone enhanced petals.

In bleed systems where fluid pressure can be tapped off from either a high pressure stage compressor or a low pressure stage compressor, a check valve is needed to prevent the high pressure stage bleed air from backflowing into the low pressure stage compressor. This check valve often includes flapper plates (or "flappers") that occupy closed positions when the high pressure stage bleed air has a higher pressure than the low pressure stage compressor whereby the high pressure stage bleed air is prevented from backflowing into the low stage compressor. These flappers open when the pressure of the low pressure stage compressor exceeds that of the high stage bleed air.

The check valves are often disposed in a vertical arrangement such that the flappers sit on washer elements that bear the weight of the flapper. As such, when the flappers open and close, contact between the flapper and the washer elements leads to wear and damage of the washer elements. This, in turn, leads to contact between the flappers and the housing of the check valve.

BRIEF DESCRIPTION OF THE INVENTION

A check valve that includes a base, two sidewalls extending from the base and a pin coupled between the two sidewalls is disclosed. The valve also includes a flapper pivotably coupled to the pin to occupy respective open and closed positions in accordance with a pressure differential of a fluid flow across the check valve, the flapper including a plate and a backbone that is thicker than the base and the extends along an entire length of the plate.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In accordance with aspects of the invention, a check valve is provided for use in bleed systems, for example. In such bleed systems, pressures can be tapped off from either a high pressure stage ("high stage") compressor or a low pressure stage ("low stage") compressor. The check valve serves to prevent high stage bleed air from backflowing into the low stage compressor and may be disposed in a substantially vertical formation. The check valve includes flapper plates that occupy respective open and closed positions in accordance with pressure differentials across the check valve and may, in one embodiment, include a backbone element to strengthen them.

Figure 1:
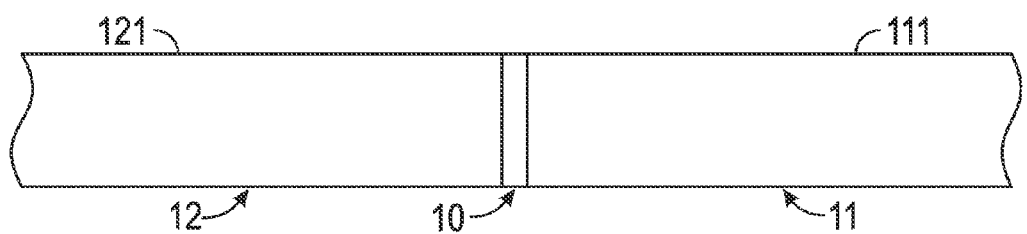
FIG. 1 is a schematic view of a check valve interposed between single ducts.
Figure 2:
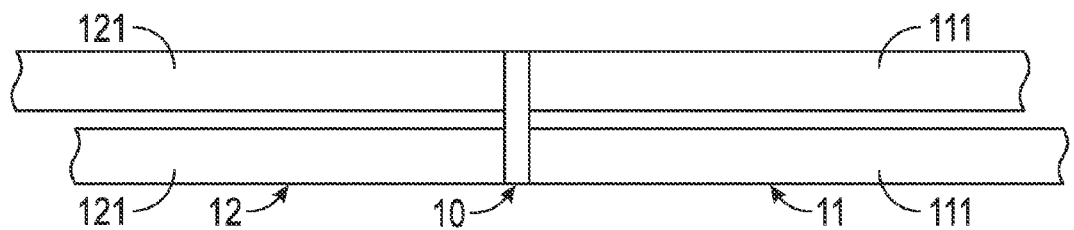
FIG. 2 is a schematic view of a check valve interposed between multiple ducts.

With reference to FIGS. 1 and 2, a check valve 10 is interposed between upstream ductwork 11 and downstream ductwork 12. As shown in FIG. 1, the upstream ductwork 11 may be formed of a single duct 111 and the downstream ductwork 12 may be similarly formed of a single duct 121. This configuration is, of course, exemplary, and it is to be understood that alternate configurations are possible. For example, as shown in FIG. 2, the upstream ductwork 11 may be formed of multiple ducts 111 and the downstream ductwork 12 may be similarly formed of multiple ducts 121.

Figure 3A:
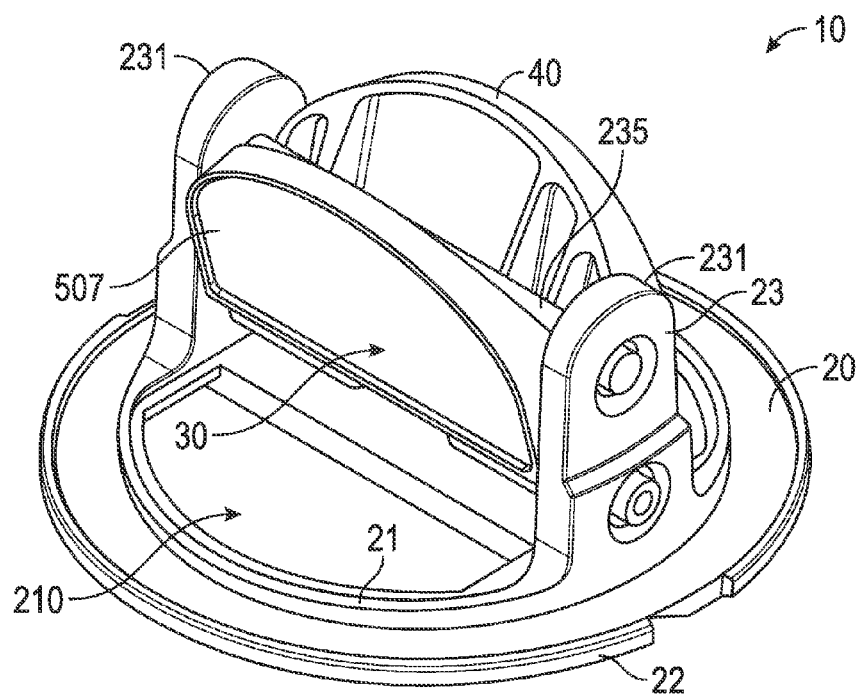
FIGS. 3A-3B show, respectively, a check valve in open and closed positions.
Figure 3B:
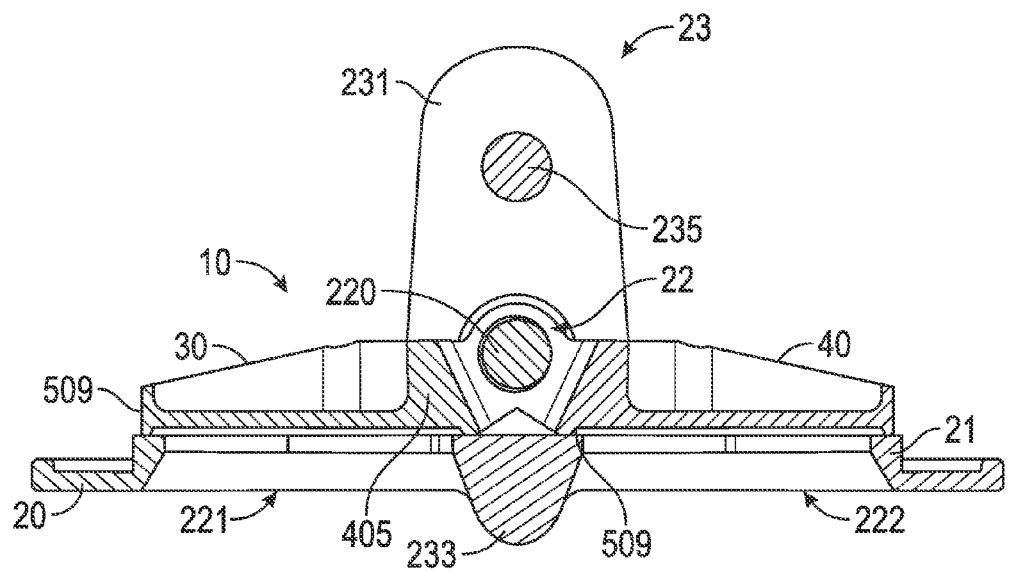

With reference to FIGS. 3A-3B, the check valve 10 includes a check valve body 20 and first and second flappers 30 and 40. The check valve body 20 includes a seat 21, a hinge 22 and a housing 23. The seat 21 is annularly shaped and is formed to define an aperture 210 that extends axially from an upstream side of the seat 21, which is associated with the upstream ductwork 11, to a downstream side of the seat 21, which is associated with the downstream ductwork 12. In accordance with embodiments, the seat 21 may be configured to fit onto the upstream ductwork 11 and the downstream ductwork 12 such that the seat 21 is fluidly interposed between an aft end of the upstream ductwork 11 and a complementary forward end of the downstream ductwork 12.

The hinge 22 may be provided as a pin-hinge with a central pivot axis defined along a pin 220. The seat 21 may include a divider 233 to bifurcate the aperture 210 defined by the seat 21 to thereby further define a first opening 221 on one side of the hinge 22 and a second opening 222 on the other side of the hinge 22.

Sidewalls 231 of the housing 23 are connected to the seat 21 and are respectively coupled to opposite ends of the pin 220 such that the pin 220 and the flappers 30, 40 form a hinge 22. The first and second flappers 30 and 40 are pivotably coupled to the pin 220 to pivot about the central pivot axis in response to a fluid pressure differential between fluid disposed within the upstream ductwork 11 (i.e., high stage bleed fluid) and fluid disposed in the downstream ductwork 12 (i.e., fluid in the low stage compressor). In particular, the first and second flappers 30 and 40 are configured to pivot from respective closed positions at which the first and second flappers 30 and 40 prevent fluid flow through the first opening 221 and the second opening 222 to respective open positions at which fluid flow through the first opening 221 and the second opening 222 is permitted. Also illustrated is a stop pin 235 disposed between the sidewalls 231 that serves to stop the flappers 30,40 as they open.

In accordance with embodiments, a pressure differential between the upstream ductwork 11 and the downstream ductwork 12 may be about 20 psi or more. At such pressures, the first and second flappers 30 and 40 may be disposed to pivot toward the respective open positions at an angular speed of about 150 radians per second or more. To handle the forces experienced in such situations prior art flappers may have been relatively thick creating large moment arms in some cases.

Figure 4A:
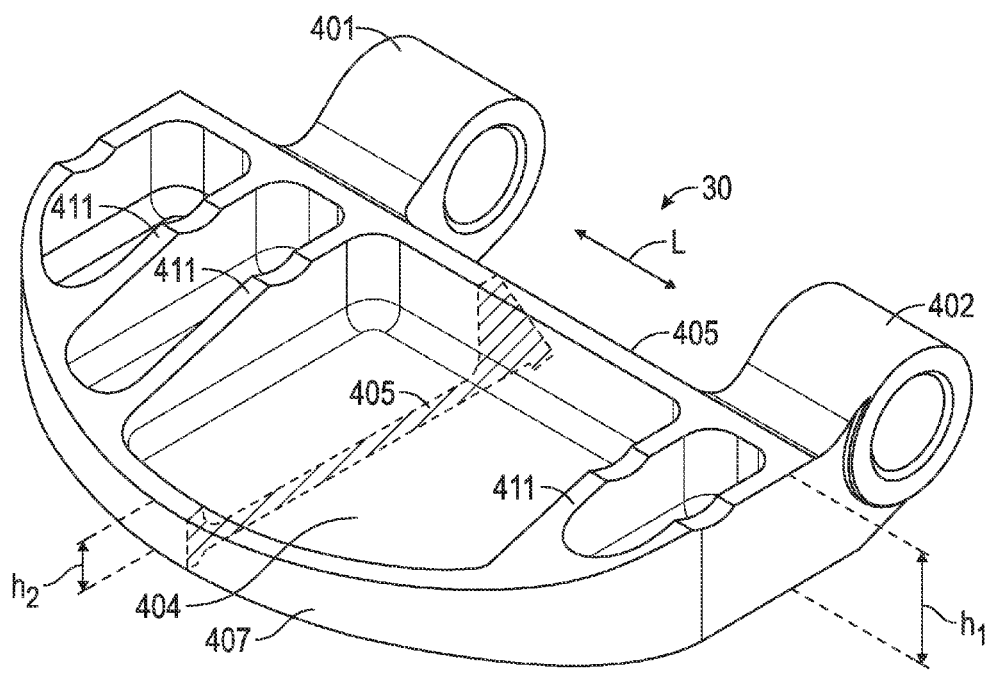
FIGS. 4A-4C show detailed views of portions of a flapper according to one or more embodiments.
Figure 4B:
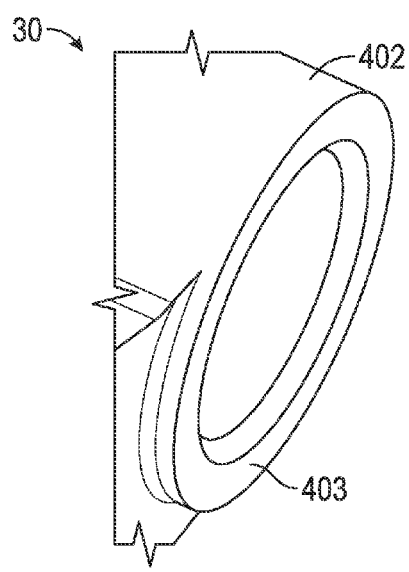
Figure 4C:
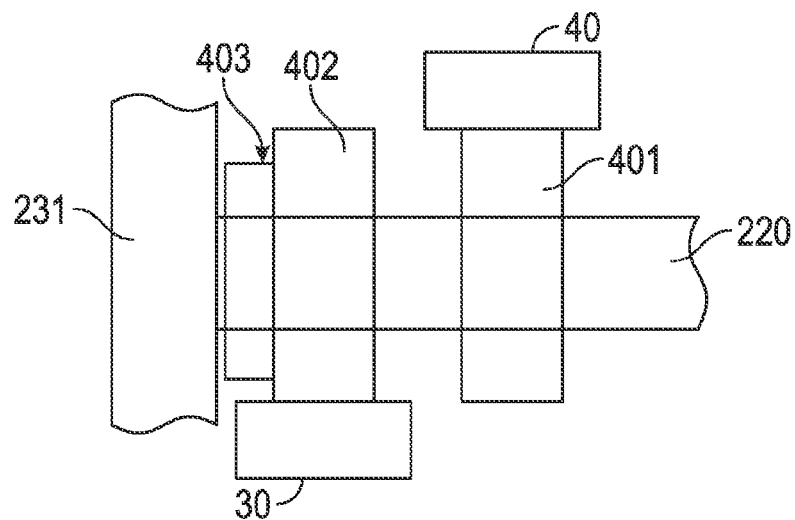

FIG. 4A shows a perspective view of an example of flapper 30 according to one embodiment. Flapper 40 may have the same or similar construction in one embodiment. The flapper 30 includes at least two hinge components 401, 402 that will surround and allow the flapper 30 to rotate about the pin 220 in one embodiment. As shown, the hinge components 401, 402 are formed as complete loops but other configurations are possible. In operation, and with further reference to FIG. 3A, hinge component 402 is arranged such that it is proximate the sidewall 231. In one embodiment, the hinge component 402 includes an extension 403 that contacts the sidewall 231. A more detailed example of the extension 403 is shown in FIGS. 4B-4C. This extension 403 may replace a thrust bearing in one embodiment. That is, in one embodiment, a check valve 10 may be provided that does not include a thrust bearing disposed between a flapper 30 and the sidewall 231. Such a configuration may provide one or more the following advantages: it may eliminate need for separate parts that can be accidentally forgotten or incorrectly connected at assembly; it may eliminate scraping of flappers 30, 40 on sidewalls 231; and it may eliminate jamming of flappers 30, 40 on sidewalls 231 during operation.

The flapper 30 includes a flapper body 404 which is a generally flat metal piece that has protrusion or ribs that extend from either the top or bottom thereof. The body 404 as well as the protrusions/ribs may be formed of aluminum, stainless steel or Inconel. In one embodiment, and as more fully described below, the including of the protrusions may allow for structurally sound flapper 30 with a thinner flapper body 404 that is lighter than prior art flappers.

As shown in FIG. 4C, where the flappers 30, 40 rotate in a pin-hinge with configuration with the central pivot axis defined along the pin 220 which may be coupled to the sidewalls 231 of the housing 23. In this embodiment, no bearing elements are disposed between the flapper 30 and the sidewall 231. Rather, extension 403 may serve to keep the body of the flapper 30 from contacting the sidewall 231. Hinge components 401, 402 are formed to define a borehole through which the pin 220 extends. The interior diameter of the borehole is sized to fit around the pin 220 such that the first and second flappers 30 and 40 pivot relatively freely in accordance with the pressure differential between the upstream ductwork 11 and the downstream ductwork 12. In one embodiment, bearings may be disposed in the hinge components 401, 402 to allow for easier rotation.

In FIG. 4A the flapper 30 includes a backbone protrusion (or "backbone") 405. In one embodiment, the backbone 405 extends over the entire length of the flapper body 404. The length of the flapper body 404 is shown by arrow L in FIG. 4A. The only portion of the flapper 30 that extends beyond the backbone 405 is the extension 403 discussed above. The backbone 405 has a first height $h_1$. The height $h_1$ of the backbone 405 is, in one embodiment, the greatest height of any protrusion extending upwardly from the body 404.

The height $h_1$ of the backbone 405 provides additional strength at the location where forces are transferred between the body 404 and the hinge components 401, 402. In prior flappers, the location where hinge components met the body was a location of failure. Further, locating the backbone 405 near the rotation location of the flapper 30 will move more of the weight of flapper 30 closer to the rotation location and reduce the rotation moment arm created.

The flapper 30 also includes, in one embodiment, an arcuate outer protrusion 407 that connects opposing ends of the backbone 405 while defining an outer periphery of the flapper 30. According to one embodiment, the outer protrusion 407 has a profile that gradually reduces from $h_1$ to a smallest height $h_2$ at a location directly opposite the midpoint of the backbone 405. Except at the ends of the backbone 405, a cross section of the flapper 30 taken perpendicular to the backbone 405 may have an I shape similar to an I-beam. Examples of such a cross section are shown by phantom crosshatching 409 in FIG. 3A as well in FIG. 4A.

Figure 5:
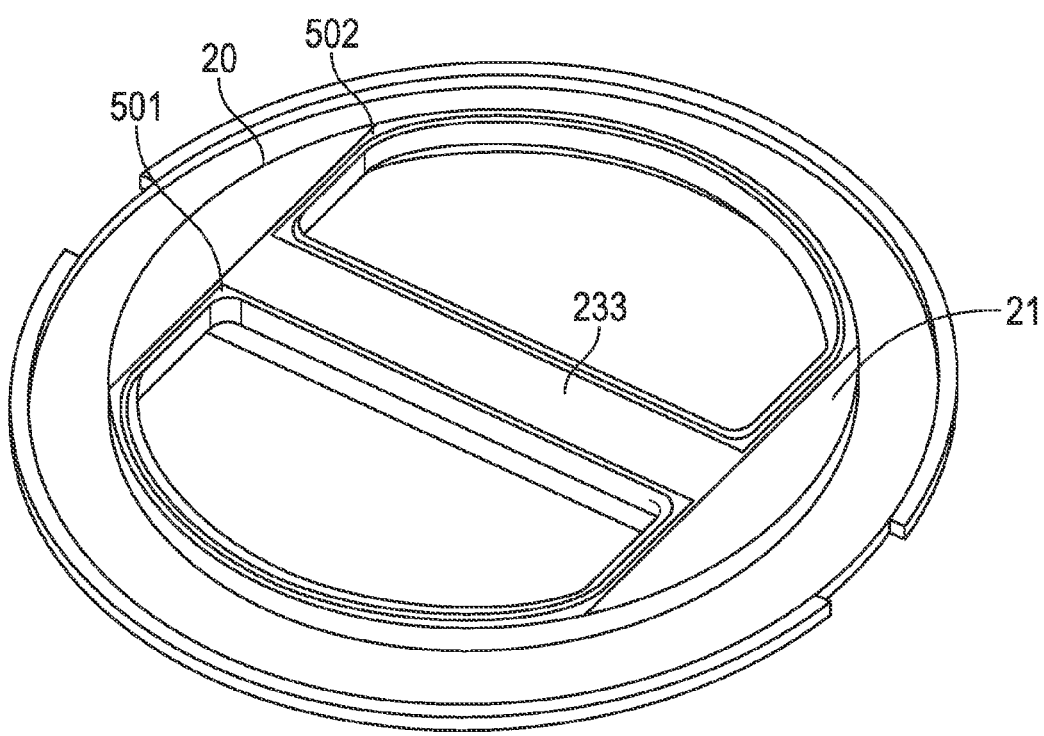
FIG. 5 is perspective view a portion of a valve body.

FIG. 5 shows an example of a seat 21 according to one embodiment. The valve body 20 has seat 21 that includes bifurcation 233. The location where each flapper 30, 40 contacts the seat 21 is shown by phantom lines 501, 502. This I shaped cross section described above leads to such a contact pattern and can be provided by, with reference to FIGS. 3A and 3B, forming a recess 507 in an underside of each flapper 30, 40 such that only the outer periphery of the flapper 30, 40 contacts the seat 21. The contact points are labelled as elements 509 in FIG. 3B. In prior systems, overlap of the flapper body 404 with the seat 21 may result in weakening of the flapper body 404 in the overlap region. In the illustrated embodiment, the contact is limited to the outer edges of the lower side of the flap as the contact region is actually a protrusion (thicker portion) formed on the underside of the flap.

With further reference to FIG. 4A, the upper surface of the flapper 30 may include one or more structural ribs 411 that extend perpendicular from the backbone 405 and extend between the backbone 405 and the outer protrusion 407. These ribs 411 may serve to provide structural strength to the flapper 30. In addition, the ribs 411 may provide additional locations 413 for contact with the stop pin 235.

Figure 6:
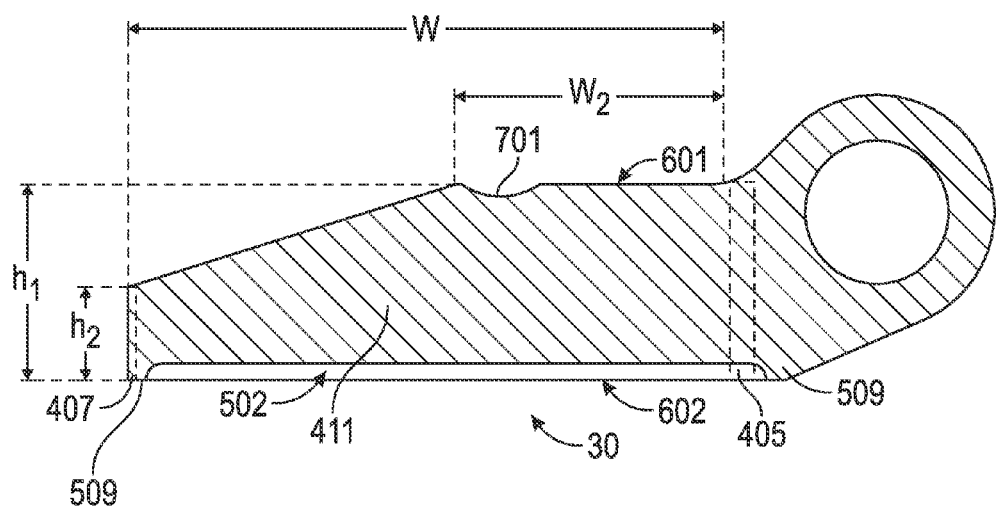
FIG. 6 is a cross-section of a flapper taken along a rib.

FIG. 6 illustrates a cross section of a flapper 30 taken along one of the ribs 411. The flapper 30 includes a top 601 and a bottom 602. The bottom 602 includes a recess 507 formed therein. The extensions defining the outer periphery of this recess 507 are labelled by reference numerals 509 and, as discussed above, they contact the seat 21 such that no portion extend off the seat 21.

The flapper 30 has a width W that extends from the backbone 405 to an end of the flapper 30. The rib 411 has a height that starts at $h_1$ at the backbone 405 and descends to $h_2$ at the outer protrusion 407. The rib 411 maintains height $h_1$ for a portion of its width W. That portion is shown as $W_2$ in FIG. 6. In one embodiment, $W_2$ is greater than or equal to the distance from the pin 220 and the stop pin 235. This provides additional structural support for the flapper 30 at the location (i.e. indentation 701) where it contacts the stop pin 235. By then reducing its height after that point, the rotational moment it forms can be reduced. In one embodiment, the rib 411 may include a recess 507 formed to accept the stop pin 235 when the flapper 30 is in the open position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A check valve, comprising:
   a body;

two sidewalls extending from the body;
a pin coupled between the two sidewalls;
a flapper pivotably coupled to the pin to occupy respective open and closed positions in accordance with a pressure differential of a fluid flow across the check valve, the flapper including a flapper body formed as a plate and a backbone that is thicker than the flapper body and extends along an entire length of the flapper body;
an arcuate outer protrusion that connects opposing ends of the backbone and extends from an upper surface of the flapper body; and
a rib extending between and connecting the arcuate outer protrusion and the backbone, the rib being perpendicular to the backbone, wherein the rib portion includes an indentation that contacts a stop pin when the check valve is in the open position.

2. The check valve of claim 1, wherein the flapper further includes at least two hinge components that couple the flapper to the pin.

3. The check valve of claim 2, wherein the at least two hinge components are coupled directly to the backbone.

4. The check valve of claim 3, wherein one of the at least two hinge components includes an extension that extends beyond an end of the backbone.

5. The check valve of claim 4, wherein the extension contacts one of the two sidewalls.

6. The check valve of claim 1, wherein the rib has a width defined as a distance from the backbone to the arcuate outer protrusion and that includes a rib portion that has a same height as a height of the backbone, the rib portion extending for less than an entire width of the rib.

7. The check valve of claim 1, wherein a bottom of the plate includes a recess and includes an extension defining an outer periphery of the recess.

8. The check valve of claim 7, wherein, when the check valve is in the closed position, the extension is the only portion of the flapper body that contacts the body.

9. A check valve, comprising:
a body;
two sidewalls extending from the body;
a pin coupled between the two sidewalls; and
a flapper pivotably coupled to the pin to occupy respective open and closed positions in accordance with a pressure differential of a fluid flow across the check valve, the flapper including a flapper body formed as a plate and a backbone that is thicker than the flapper body and extends along an entire length of the flapper body,
wherein the flapper further includes at least two hinge components that couple the flapper to the pin, the at least two hinge components coupled directly to the backbone, and wherein one of the at least two hinge components includes an extension that extends beyond an end of the backbone.

10. The check valve of claim 9, wherein the extension contacts one of the two sidewalls.

11. The check of valve of claim 9, further including an arcuate outer protrusion that connects opposing ends of the backbone and extends from an upper surface of the flapper body.

12. The check valve of claim 11, further including a rib extending between and connecting the arcuate outer protrusion and the backbone.

13. The check valve of claim 12, wherein the rib is perpendicular to the backbone.

14. The check valve of claim 13, wherein the rib has a width defined as a distance from the backbone to the arcuate outer protrusion and that includes a rib portion that has a same height as a height of the backbone, the rib portion extending for less than an entire width the rib.

15. The check valve of claim 13, wherein the rib portion includes an indentation that contacts a stop pin when the check valve is in the open position.

16. The check valve of claim 9, wherein a bottom of the plate includes a recess and includes an extension defining an outer periphery of the recess.

17. The check valve of claim 16, wherein, when the check valve is in the closed position, the extension is the only portion of the flapper body that contacts the body.

* * * * *